United States Patent [19]

Galli

[11] Patent Number: 4,584,179
[45] Date of Patent: Apr. 22, 1986

[54] APPARATUS FOR TREATING CEMENT KILN DUST

[76] Inventor: Ramon Galli, 120 Newport St., Nanticoke, Pa. 18634

[21] Appl. No.: 611,619

[22] Filed: May 18, 1984

[51] Int. Cl.⁴ .............................................. B01J 8/00
[52] U.S. Cl. .................... 422/187; 422/226; 422/229; 71/64.05
[58] Field of Search ............... 422/178, 137, 225, 226, 422/229, 187; 71/64.05; 202/118, 128, 131–134; 34/166, 181; 55/261, 220; 261/115; 239/8

[56] References Cited

U.S. PATENT DOCUMENTS

| | | | |
|---|---|---|---|
| 1,475,901 | 11/1923 | Thompson | 202/118 |
| 2,976,131 | 3/1961 | Miline | 422/226 |
| 3,427,145 | 2/1969 | West | 71/64.05 |
| 3,538,067 | 11/1970 | Bognar | 422/137 |
| 3,599,866 | 8/1971 | Bolton | 239/8 |
| 3,725,029 | 4/1973 | Blackmore | 71/64.05 |
| 3,939,881 | 2/1976 | Scott | 261/115 |
| 4,157,244 | 6/1979 | Gernhardt et al. | 55/261 |
| 4,316,728 | 2/1982 | Caesar | 55/242 |
| 4,402,891 | 9/1983 | Kachinski, Jr. | 264/117 |
| 4,504,013 | 3/1985 | Huffman | 239/433 |

FOREIGN PATENT DOCUMENTS

| | | | |
|---|---|---|---|
| 8301910 | 6/1983 | Int'l Pat. Inst. | 422/229 |
| 60167 | 5/1979 | Japan | 71/64.05 |

Primary Examiner—David L. Lacey
Attorney, Agent, or Firm—Robert K. Youtie

[57] ABSTRACT

A cement kiln dust treating apparatus including a reaction chamber for receiving kiln dust, nozzles in an upper region of the reaction chamber for atomizing and discharging spray to the kiln dust, mixing blades for mixing the dust in contact with the spray, and a pelletizer for pelletizing the mixed and contacted kiln dust product.

9 Claims, 8 Drawing Figures

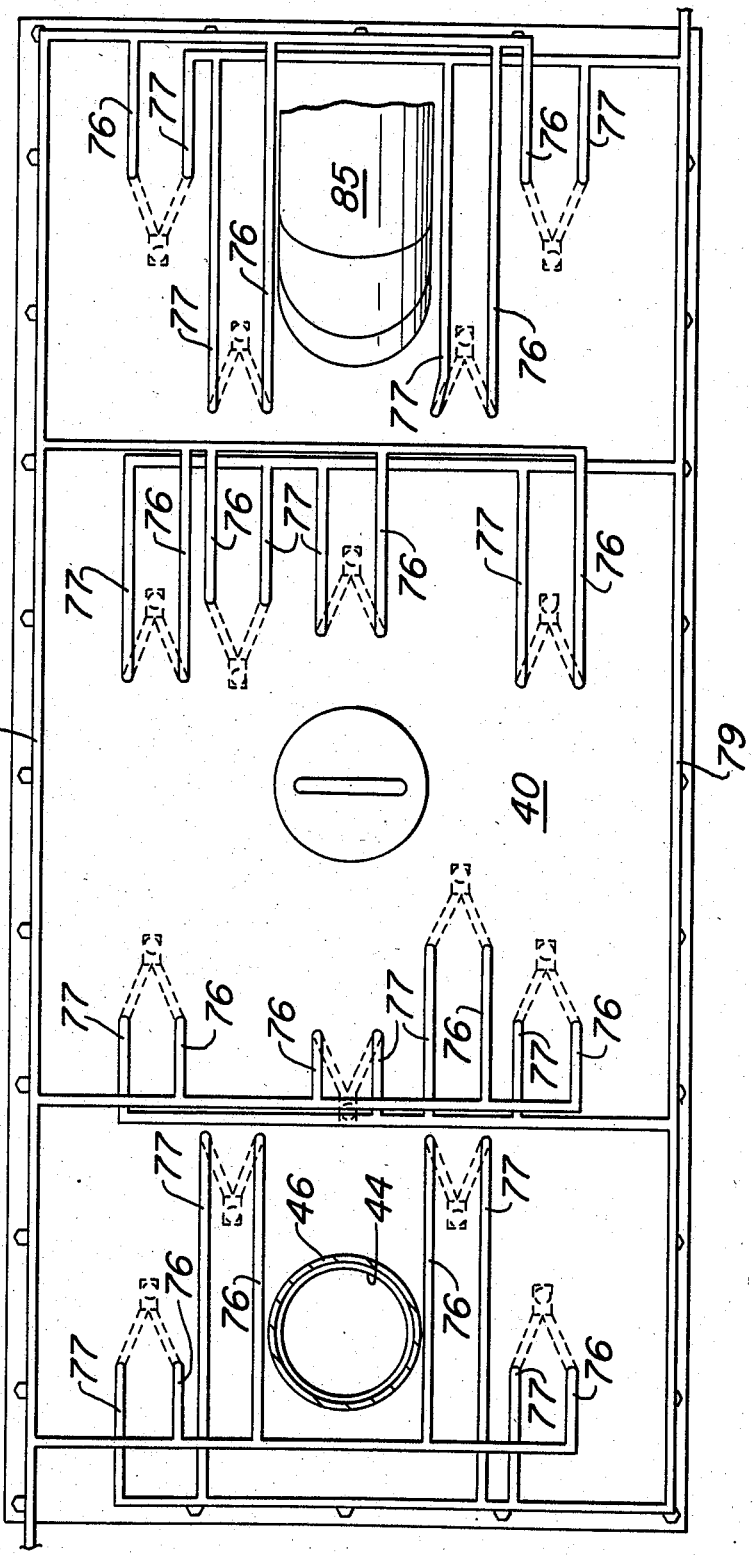

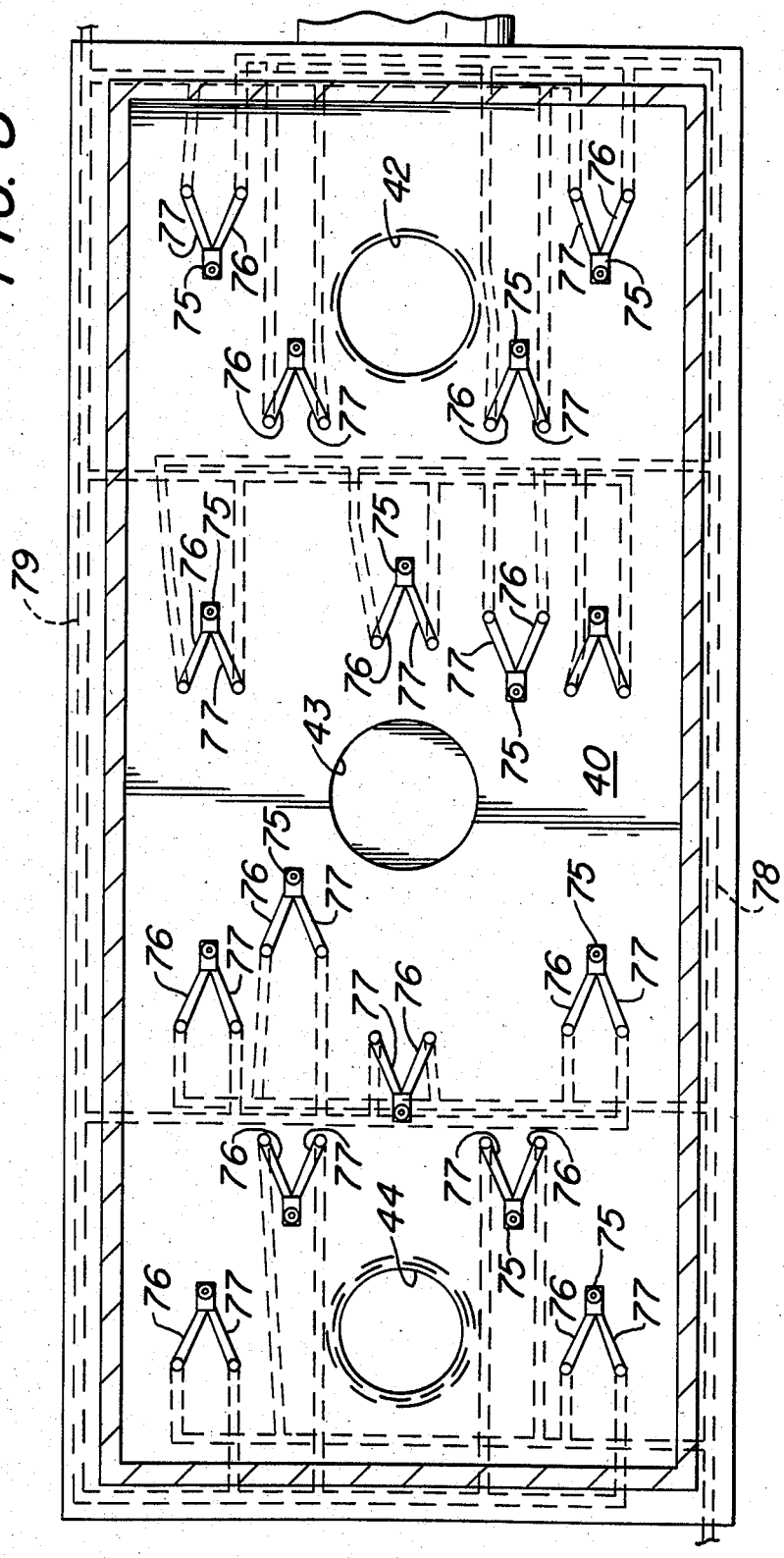

APPARATUS FOR TREATING CEMENT KILN DUST

BACKGROUND OF THE INVENTION

It is well known that cement kiln dust has, in the past, involved substantial disposal expense. By the method of U.S. Pat. No. 4,402,891, there has been proposed a highly advantageous method of processing waste cement kiln dust to make a soil treatment composition, for reuse in cement manufacture, and others. Applicant herein has provided a unique combination and arrangement of components for practicing said patented method.

Applicant is aware of the below listed prior patents in the field:

| PATENTEE | U.S. Pat. No. |
| --- | --- |
| Gentaz | 3,555,133 |
| Adams et al. | 3,630,713 |
| Herchenbach | 4,162,922 |
| Cohen | 4,173,487 |
| Duessner | 4,248,641 |

While these prior patents are concerned with mixing and pelletizing, there is no suggestion of applicant's combination and arrangement of components, nor of the reaction chamber construction and associated parts.

SUMMARY OF THE INVENTION

It is an important object of the present invention to provide apparatus for treating waste kiln dust which includes a reaction chamber having atomizing spray nozzles in an upper region for producing a fog in the chamber, and an agitator in a lower region for stirring, mixing and exposing kiln dust in and to the fog atmosphere to suitably treat the dust.

It is a further object of the present invention to provide kiln dust processing apparatus of the type described in the preceding paragraph including means for passing gas through the reaction chamber for reacting the dust with the gas and fog.

It is a further object to provide atomizing nozzles which operate by the conjoint action of liquid and gas to produce fog for moistening and/or wetting the dust and gas for reaction with the moistened and/or wet dust.

It is still another object of the present invention to provide apparatus having the advantageous characteristics mentioned in the preceding paragraphs, which is adapted for use in a large range of sizes, as from a demonstration or pilot plant size up to a full size for treating all the waste kiln dust of a cement plant.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 7 is a partial top plan view showing the top of the reaction chamber illustrating the arrangement of nozzles.

FIG. 8 is a horizontal sectional view taken generally along the line 8—8 of FIG. 5 illustrating the top wall of the reaction chamber from the underside.

DESCRIPTION OF THE PREFERRED EMBODIMENT

Figure 1:
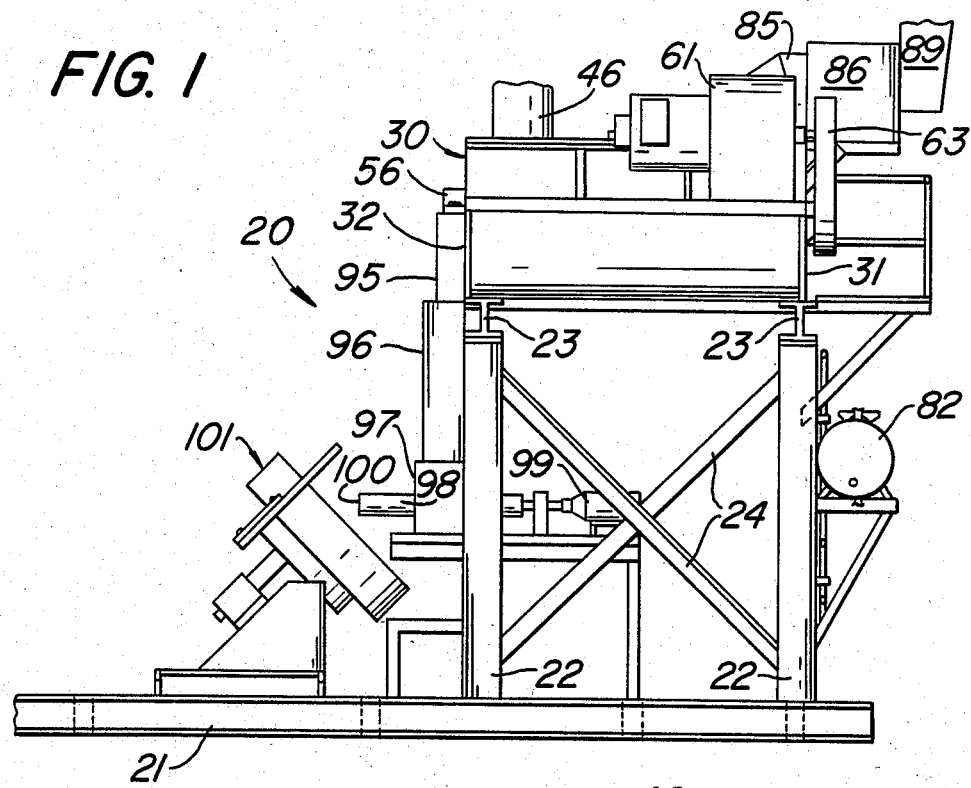
FIG. 1 is a front elevational view showing apparatus constructed in accordance with the teachings of the present invention.

Referring now more particularly to the drawings, and specifically to FIGS. 1-4 thereof, the apparatus is generally designated 20, and includes a lower support or base 21 which may be composed of a generally horizontal array of frame members or beams having extending therebetween horizontal support members or plates, as required. Upstanding from the base 21 may be a rectangular array of uprights or columns, as at 22; and, a pair of generally horizontal, forwardly and rearwardly extending upper frame members or beams 23 may extend between upper ends of respective pairs of uprights. Rigidifying diagonal braces may extend between adjacent pairs of uprights 22, such as front braces 24 extending between the front pair of uprights and diagonal side braces 25 extending between a pair of front and rear uprights toward one side.

Figure 5:
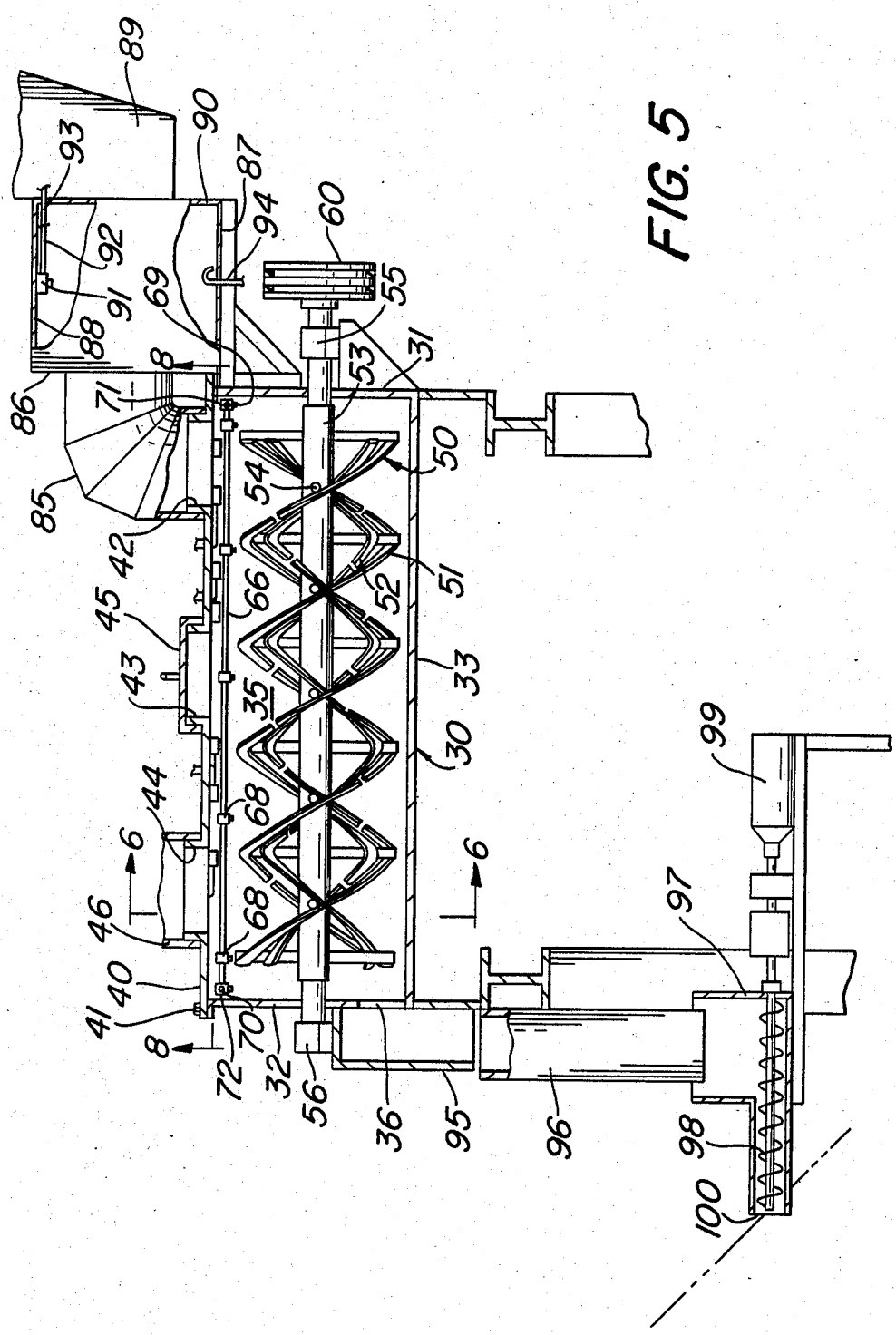
FIG. 5 is a longitudinal sectional elevational view taken generally along the line 5—5 of FIG. 2.

Mounted on the upper horizontal beams or bridging members 23 is a horizontally elongate, elevated reaction chamber or vessel 30. The chamber or vessel 30 includes a pair of parallel spaced, generally vertically disposed end walls 31 and 32 upstanding from respective beams 23. Extending between the end walls 31 and 32, at lower regions thereof, is a lower chamber wall or bottom 33, of generally semi-cylindrical, upwardly concave configuration, best seen in FIG. 6. Generally vertical front and rear chamber walls 34 and 35 extend upwardly from the front and rear of chamber bottom wall 33, being generally tangent to the cylinder and merging smoothly with the bottom wall. The vessel end wall 32, in a lower region thereof as seen in FIG. 5, is formed with an outlet or discharge opening 36, for the exit of materials, as will appear presently.

The chamber or vessel 30 includes a generally horizontal top wall 40, which may be a generally rectangular flat plate removably secured to the upper edges of the vessel end walls 31 and 32, and the vessel front and back walls 34 and 35, as by flange bolts 41, or other suitable fasteners. Thus, the vessel top wall 40 is generally rectangular, being spaced over the cylindrical bottom wall 33, and is provided with a row or series of through openings, as at 42 adjacent to the end wall 31, 43 spaced medially between the chamber end walls, and 44 adjacent to the end wall 32, best seen in FIG. 5. The opening 42 is an entry opening for passing gas into the interior of chamber 30, which gas may be air, exhaust gas from another process, or carbon dioxide, each of which may provide the desired carbon dioxide-containing atmosphere. The medial chamber opening 43 provides for the introduction of waste cement kiln dust to the interior of the chamber 30, which dust may be introduced continuously during the process, or intermittently. A cap or closure 45 is shown removably positioned over the opening 43, as for use with intermittent introduction of dust, while a suitable conduit may be provided for continuous dust introduction.

The remaining chamber top opening 44 is for the removal of gas from the chamber 30, as through conduit or pipe 46, after the gas has passed inwardly through the opening 42 and substantially entirely through the chamber. If desired, the gas discharged through opening 44 may be reused, by suitable ducting, not shown.

Figure 6:
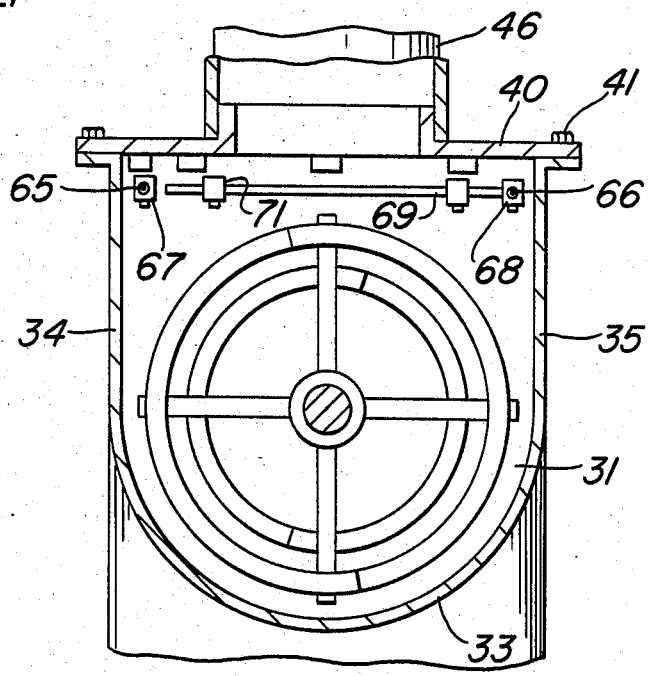
FIG. 6 is a transverse sectional view taken generally along the line 6—6 of FIG. 5.

Extending longitudinally within the chamber 30 is a mixing structure, generally designated 50. The mixing structure 50 is advantageously of the spiral ribbon, blade or paddle type, preferably including an outer spiral blade 51 and an inner spiral or blade 52, both extending coaxially about a rotary shaft 53 and mounted thereto by suitable supporting structure, as radial arms 54. The central shaft 53 may be generally coaxial with the cylindrical bottom wall 33, as seen in FIG. 6, and may have its opposite ends extending in sealed relation outwardly through respective end walls 31 and 32 for rotary mounting by suitable journals or pillow blocks 55 and 56.

Either one or both of the blades 51 and 52 may be interrupted or discontinuous; and may spiral in the angular direction to effect vigorous stirring and mixing of particulate contents in the chamber or vessel 30, while discharging the well mixed material through outlet 36. For example, the inner blade 52 may be angularly directed to cause rightward movement of the particulate contents, as seen in FIG. 5, while the outer blade 51 may be angularly directed to cause leftward movement of the particulate contents, which has been found to effectively stir, agitate, mix, knead and expose the contents and effecting the desired discharge.

A mixer drive may include a pulley or sheave 60 keyed to shaft 53 outboard of journal or pillow block 55 and connected in driven relation to a suitable prime mover or motor 61 mounted on a support 62 outstanding from the front wall 34 of the chamber 30. A belt housing 63 may be seen to extend from the motor 61 downwardly and rearwardly to enclose belting and the pulley 60.

It will be seen that the mixer structure 50 passes adjacent to, but is spaced from the chamber bottom wall 33, front and back walls 34 and 35. In order to help maintain the moisture laden dust mixture free from the front and back chamber walls 34 and 35, as well as the chamber end walls 31 and 32, there may be provided suitable gas blowing means, such as horizontal conduits 65 and 66 extending along upper regions of and suitably secured to the front and back chamber walls 34 and 35, respectively. The conduits 65 and 66 are provided at spaced locations therealong with downwardly facing gas outlets or nozzles, being respectively designated 67 and 68, which nozzles are directed downwardly and may be supplied with compressed air to aid in clearing the front and back walls.

Similarly, the end walls 31 and 32 are provided along their upper regions with horizontally extending conduits or pipes 69 and 70, respectively including downwardly discharging nozzles 71 and 72, for aid in clearing the end walls of dust accumulation.

Carried on the underside of the chamber top wall 40 are a plurality of downwardly facing spray nozzles 75. Referring particularly to FIG. 8, it will be seen that the nozzles 75 are arrayed substantially over the entire undersurface of the top wall 40. The nozzles 75 are located in generally equidistant relation with respect to each other to discharge generally evenly and uniformly throughout the entire chamber 30. Advantageously, the nozzles 75 are of a spray atomizing type utilizing gas to effect atomization of the liquid being sprayed. In this manner the nozzles discharge downwardly to effectively fill the chamber 30 with the liquid spray in a fog-like condition. Further, the atomizing gas may be carbon dioxide, or other gas containing carbon dioxide for reaction with the kiln dust.

It will be seen in FIG. 8 that each downwardly facing atomized-spray nozzle 75 fixed to the underside of the chamber top wall 40 is connected to a pair of feed conduits or hoses 76 and 77, respectively carrying air or gas, and liquid or water. Exteriorly of the chamber 30, above the top wall 40, there are provided distribution conduits or manifolds, as at 78 and 79, respectively for air or gas, and water or liquid. The distribution conduits or manifolds 78 and 79 are best seen in FIG. 7, as connected to the several feed conduits or hoses 76 and 77. By any suitable means, the manifolds 78 and 79 and feed conduits 76 and 77, as well as the nozzles 75 are all fixed to the top wall 40, for convenient removal from the chamber together with the top wall.

Figures 2, 3, 4:
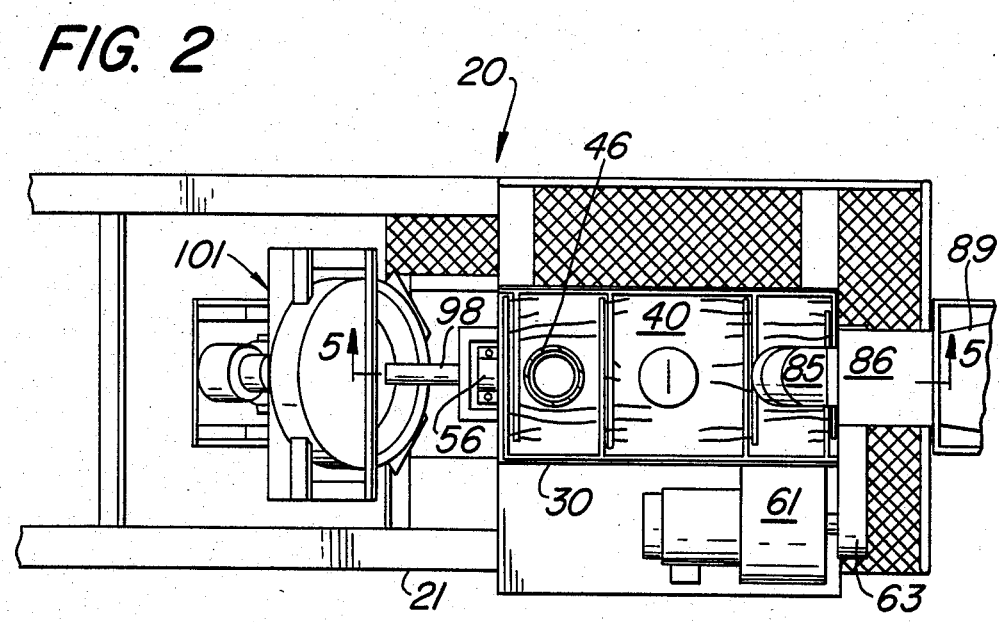
FIG. 2 is a top plan view of the apparatus of FIG. 1.
FIG. 3 is a side elevational view taken generally from the left side of FIG. 1.
FIG. 4 is a side elevational view taken from the right side of FIG. 1.

By any suitable detachable coupling or union the manifolds 78 and 79 may be connected to supply sources of liquid and gas. For example, there is shown in FIG. 4 an air supply line 80 for connection to a source of compressed air or other gas supply, and connected by any suitable means to the manifold 78. Similarly, a water or liquid supply line is shown in FIG. 4 at 81, for connection to a source of water or liquid; and, there may be provided a metering water storage tank 82, or any suitable metering device connected between the water supply line 81 and the manifold 79.

The gas entry opening 42 may be connected through an elbow duct 85 with a source of gas supply. That is, the gas inlet elbow 85 is arranged with its downstream end communicating vertically downwardly through the chamber entry opening 42 into the interior of the chamber. The upstream end of the elbow duct 85 extends generally horizontally and opens into a gas receiver compartment or box 86.

The gas receiver compartment 86 may be generally box-like, being illustrated as cut-away in FIG. 5 to show a bottom wall 87, a top wall 88, and a gas feed duct 89 connected to an inlet wall 90. The other end of the inlet duct 89 may be connected to an air supply, or the exhaust gas of a cement plant, or other gas supply containing carbon dioxide.

On the underside of the top wall 88, there may be at least one downwardly facing atomized-spray nozzle 91 having connected thereto air or gas, and water or liquid feed hoses or conduits 92 and 93. The nozzle 91 may be the same as the hereinbefore described nozzles 75, and may be a conventional air atomizing liquid spray nozzles. The air and liquid feed lines 92 and 93 may be connected to the air and liquid manifolds 78 and 79. By this means the gas entering through gas receiver compartment 86 is effectively saturated with liquid by the fog-like atmosphere in the compartment. In the bottom wall 87 of the compartment 86 there may be a drain 94 for removing excess liquid. Any and all of the nozzles 75 and 91 may be operated with compressed air or gas.

An outlet duct 95 communicates downwardly from the discharge opening 36 of the reaction chamber 30 to the upper end of a duct extension 96 which passes the treated kiln dust to the receiver 97 of a screw conveyor 98.

The screw conveyor may be driven by suitable motive means 99 for discharging the treated material from the conveyor end 100 to an agglomerator or pelletizer 101, see FIG. 1. The pelletizer may be conventional, such as the disk pelletizer of Sprout-Waldron. The pelletizer forms the treated material into pellets for discharge into containers, as desired. Additional equipment may be employed, such as dryers, sizing screens and the like.

From the foregoing it is seen that the present invention provides an apparatus for treating cement kiln dust which is extremely simple in construction for reliability in operation throughout a long useful life, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. Apparatus for treating cement kiln dust comprising an elongate reaction chamber, kiln dust entry means in said reaction chamber, atomized-spray nozzles in said reaction chamber for introducing atomized spray to kiln dust, separate conduits for liquid and gas separately connected to said atomized-spray nozzles for atomizing liquid by gas to form a fog of the liquid in an atmosphere of the gas, mixing means in said reaction chamber for mixing the kiln dust in contact with the fog and gaseous atmosphere of the reaction chamber, discharge means at one end of said reaction chamber for discharging the mixed and contacted kiln dust product from the reaction chamber, said kiln dust entry means being located in an upper region of said reaction chamber for depositing kiln dust gravitationally to a lower region of said reaction chamber, said atomized-spray nozzles being located in said upper region of said reaction chamber for depositing fog on kiln dust during mixing thereof, gas entry means on said reaction chamber for delivering gas to said reaction chamber for reaction with kiln dust and fog, gas exit means on said reaction chamber for discharging gas products from said reaction chamber, said gas entry and exit means being at opposite ends of said reaction chamber, and pre-entry liquid atomizing spray means in said gas entry means for treating gas by atomized liquid spray to effectively saturate the gas before delivery to said reaction chamber.

2. Apparatus according to claim 1, said reaction chamber including a top wall, and said gas entry means including a hollow elbow having an upstream portion for communication with a gas supply and a downstream portion communicating through said top wall into said reaction chamber, said pre-entry liquid atomizing spray means being located in said upstream elbow portion for cooling and substantially saturating the gas entering said reaction chamber.

3. Apparatus according to claim 1, said mixing means comprising blade means movable interiorly of said reaction chamber to stir and mingle kiln dust which has been contacted with atomized liquid spray and gas.

4. Apparatus according to claim 3, said reaction chamber having a top wall, and said atomized-spray nozzles being supported by the underside of said top wall and arranged to spray downwardly and dispense the liquid fog-like substantially throughout said reaction chamber.

5. Apparatus according to claim 4, said reaction chamber having upstanding side walls, and air dispensing means along upper regions of said side walls and directed downwardly for clearing the side walls of dust during mixing and directing cleared dust toward said blade means.

6. Apparatus according to claim 4, said nozzles being multiple in number and spaced about the underside of said top wall for enhancing the uniformity and density of fog-like atmosphere within said chamber.

7. Apparatus according to claim 4, said top wall being detachably connected to the remainder of said reaction chamber, for removal of said top wall together with said atomized-spray nozzles.

8. Apparatus according to claim 1, said discharge means comprising an outlet opening for passing the reaction dust product after mixture and contact with liquid and gas.

9. Apparatus according to claim 8, in combination with a pelletizer communicating with said reaction chamber outlet opening for receiving the reaction dust product and aggregating the same.

* * * * *